(12) United States Patent
Li et al.

(10) Patent No.: US 11,057,565 B2
(45) Date of Patent: Jul. 6, 2021

(54) IMAGE OBTAINING METHOD AND TERMINAL DEVICE

(71) Applicant: Huawei Technologies Co., Ltd., Shenzhen (CN)

(72) Inventors: Yuanyou Li, Shanghai (CN); Huanyu Liu, Shanghai (CN); Rongyue Xu, Shanghai (CN); Huanhuan Ao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/342,498

(22) PCT Filed: Jan. 12, 2017

(86) PCT No.: PCT/CN2017/070995
§ 371 (c)(1),
(2) Date: Apr. 16, 2019

(87) PCT Pub. No.: WO2018/072353
PCT Pub. Date: Apr. 26, 2018

(65) Prior Publication Data
US 2019/0260934 A1    Aug. 22, 2019

(30) Foreign Application Priority Data
Oct. 17, 2016    (CN) .......................... 201610903424.8

(51) Int. Cl.
*H04N 5/232*    (2006.01)
*G03B 5/00*    (2021.01)

(52) U.S. Cl.
CPC ........... *H04N 5/23258* (2013.01); *G03B 5/00* (2013.01); *H04N 5/232* (2013.01);
(Continued)

(58) Field of Classification Search
CPC .... H04N 5/2254; H04N 5/2257; H04N 5/232; H04N 5/23258; H04N 5/23264;
(Continued)

(56) References Cited

U.S. PATENT DOCUMENTS 7,339,612 B1 * 3/2008 Yajima ................. G02B 27/646
348/208.2
7,440,028 B2 * 10/2008 Takeda ................. G02B 27/646
348/208.99
(Continued)

FOREIGN PATENT DOCUMENTS

CN        101345824 A    1/2009
CN        102082910 A    6/2011
(Continued)

*Primary Examiner* — Lin Ye
*Assistant Examiner* — Chriss S Yoder, III
(74) *Attorney, Agent, or Firm* — Slater Matsil, LLP

(57) ABSTRACT

Embodiments of this application provide an image obtaining method and a terminal device. When the terminal device moves, a motion sensor collects motion data of the terminal device, and sends the motion data to an optical image stabilization OIS controller and an electronic image stabilization EIS controller, where the terminal device includes the motion sensor, the OIS controller, the EIS controller, and an image sensor. The OIS controller controls, based on the motion data, a lens of the terminal device to move. The image sensor collects an image sequence. The EIS controller performs, by using movement information of the lens and the motion data, jitter compensation on the image sequence collected by the image sensor, so that stability of an obtained image can be improved.

20 Claims, 6 Drawing Sheets

(52) U.S. Cl.
CPC ..... *H04N 5/23264* (2013.01); *H04N 5/23267* (2013.01); *H04N 5/23287* (2013.01); *G03B 2205/0007* (2013.01)

(58) Field of Classification Search
CPC .. H04N 5/23267; H04N 5/23287; G03B 5/00; G03B 2205/0007
See application file for complete search history.

(56) References Cited

U.S. PATENT DOCUMENTS

| | | | |
|---|---|---|---|
| 8,169,487 B2 * | 5/2012 | Noguchi | G03B 17/00 348/208.11 |
| 9,232,138 B1 | 1/2016 | Baldwin | |
| 9,674,443 B2 * | 6/2017 | Kaneko | G03B 5/00 |
| 2008/0211922 A1 | 9/2008 | Murashima et al. | |
| 2009/0115859 A1 | 5/2009 | Lee | |
| 2011/0134259 A1 | 6/2011 | Kim et al. | |
| 2013/0155262 A1 | 6/2013 | Katoh et al. | |
| 2015/0092068 A1 | 4/2015 | Nonaka et al. | |
| 2016/0057352 A1 | 2/2016 | Yoneda et al. | |
| 2016/0182828 A1 * | 6/2016 | Ikeda | H04N 5/23264 348/208.5 |
| 2016/0327806 A1 | 11/2016 | Kasamatsu | |
| 2018/0091739 A1 * | 3/2018 | Murakami | H04N 5/23274 |

FOREIGN PATENT DOCUMENTS

| | | | |
|---|---|---|---|
| CN | 102754023 | A | 10/2012 |
| CN | 103167237 | A | 6/2013 |
| CN | 104349059 | A | 2/2015 |
| CN | 104967785 | A | 10/2015 |
| CN | 105191283 | A | 12/2015 |
| CN | 105611166 | A | 5/2016 |
| EP | 0656725 | A1 | 6/1995 |
| JP | 2001197357 | A | 7/2001 |
| JP | 2004239962 | A | 8/2004 |
| JP | 2013135443 | A | 7/2013 |
| TW | 201535007 | A | 9/2015 |
| WO | 2007094282 | A1 | 8/2007 |
| WO | 2011086728 | A1 | 7/2011 |

* cited by examiner

600

When a terminal device moves, collect motion data of the terminal device, and send the motion data to an OIS controller and an EIS controller — S610

The OIS controller controls movement of a lens of the terminal device based on the motion data — S620

An image sensor collects an image sequence — S630

The EIS controller performs, by using movement information of the lens and the motion data, jitter compensation on the image sequence collected by the image sensor — S640

FIG. 7

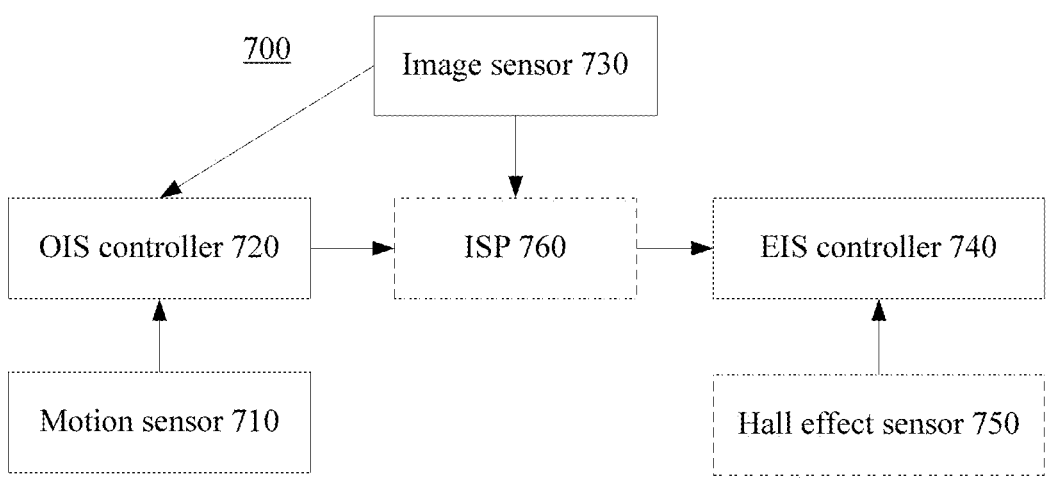

FIG. 8

IMAGE OBTAINING METHOD AND TERMINAL DEVICE

CROSS-REFERENCE TO RELATED APPLICATIONS

This application is a national stage of International Application No. PCT/CN2017/070995, filed on Jan. 12, 2017, which claims priority to CN Application No. 201610903424.8, filed Oct. 17, 2016, which applications are hereby incorporated herein by reference.

TECHNICAL FIELD

This application relates to the field of image processing, and in particular, to an image obtaining method and a terminal device in the field of image processing.

BACKGROUND

In a photographing or video recording process, a user hand inevitably shakes, or a user may perform a photographing or recording operation while moving. Consequently, there may be jitter and blur on a captured image, or there may be jitter and blur on a recorded video.

To resolve a shake problem in photographing and video recording processes, an optical image stabilization ("OIS" for short) technology and an electronic image stabilization ("EIS" for short) technology are provided. In the OIS technology, a motion sensor (a gyroscope or an accelerometer) detects shake of a mobile phone during photographing exposure, and an OIS controller controls to drive an OIS motor based on jitter data detected by the motion sensor, to move a lens or an image sensor, so that an optical path is kept stable and unchanged as much as possible during the entire exposure, and a clear exposed image is obtained. However, because the mobile phone may continuously shake or move, a position and a posture of the mobile phone may vary greatly during exposure of each frame of image. Even if the OIS technology is used, there is still apparent jitter and displacement between consecutive frames of images during video recording. There are two types of EIS technologies. One is image stabilization processing based on image content in which a motion status of an image is identified based on content of two adjacent image frames, and after images are registered and aligned with each other, processing such as clipping, stretching, or deformation is appropriately performed to generate a relatively stable image sequence. Disadvantages of this method are: a large amount of calculation, a low speed, and high power consumption. The other is image stabilization processing based on motion sensor data in which a motion status between frames and a motion status inside a frame of image are calculated based on motion sensor data that is obtained during exposure of each frame of image, and images are registered and then processing such as clipping, stretching, or deformation is appropriately performed to generate a relatively stable image sequence. Such an algorithm has a high speed and low power consumption.

An increasing quantity of mobile phones support both the OIS technology and the EIS technology, to resolve a shake problem during photographing and video recording. The OIS technology is mainly used to perform image stabilization processing on an image in a photographing process. The EIS technology is mainly used to perform image stabilization processing on an image sequence in a video recording process. However, for a solution in which the OIS technology and the EIS technology based on motion sensor data are used, overcompensation occurs if the two image stabilization technologies are directly combined to perform image compensation.

SUMMARY

Embodiments of this application provide an image obtaining method and a terminal device, to improve stability of an obtained image.

According to a first aspect, an image obtaining method is provided. The terminal device includes a motion sensor, an optical image stabilization OIS controller, an electronic image stabilization EIS controller, a lens, and an image sensor, and the method includes: when the terminal device moves, collecting, by the motion sensor, motion data of the terminal device, and sending the motion data to the OIS controller and the EIS controller; controlling, by the OIS controller based on the motion data, the lens of the terminal device to move; collecting, by the image sensor, an image sequence; and performing, by the EIS controller by using movement information of the lens and the motion data, jitter compensation on the image sequence collected by the image sensor.

In this embodiment of this application, the OIS controller moves the lens of the terminal device based on the motion data collected by the motion sensor, to perform first compensation, so that when the image sensor collects the image sequence, an optical path is kept stable and unchanged as much as possible, and a clear exposed image sequence is obtained. The EIS controller performs, based on the motion data and the movement information that is obtained after the OIS controller controls the lens to move, second compensation on the image sequence collected by the image sensor. In other words, the first compensation is considered during the second compensation. In the prior art, an OIS controller performs jitter compensation on an image sequence based on motion data, and an EIS controller also performs jitter compensation on the image sequence based on the motion data. In other words, the same motion data is used to compensate for the image sequence twice in the prior art, and there is no association between the two times of compensation, resulting in overcompensation. However, in this embodiment of this application, the movement information of the lens in an OIS technology is considered when jitter compensation is performed on the image sequence by using an EIS technology, so that overcompensation in the prior art can be avoided and image stability can be improved.

Optionally, when the terminal device moves, the OIS controller controls the lens to move, and the image sensor may collect the image sequence based on an image collection period.

Optionally, that the EIS controller performs, by using the movement information of the lens and the motion data, jitter compensation on the image sequence collected by the image sensor may be: the EIS controller converts the motion data of the lens into a lens movement pixel compensation amount, and then performs, by using the movement pixel compensation amount and the motion data, jitter compensation on the image sequence collected by the image sensor; or may be: the OIS controller obtains the motion data of the lens, and converts the motion data of the lens into a lens movement pixel compensation amount; and the EIS controller may directly obtain the lens movement pixel compensation amount, and performs, by using the movement pixel compensation amount and the motion data, jitter compensation on the image sequence collected by the image sensor.

In some implementations, the terminal device further includes a Hall effect sensor, and before the performing, by the EIS controller by using movement information of the lens and the motion data, jitter compensation on the image sequence collected by the image sensor, the method further includes: collecting, by the Hall effect sensor, the movement information of the lens; and the performing, by the EIS controller by using movement information of the lens and the motion data, jitter compensation on the image sequence collected by the image sensor includes: performing, by the EIS controller by using the movement information of the lens collected by the Hall effect sensor and the motion data, jitter compensation on the image sequence collected by the image sensor.

In this embodiment of this application, the Hall effect sensor may sense the movement information of the lens, and collects the movement information of the lens of the terminal device.

In some implementations, after the collecting, by the Hall effect sensor, the movement information of the lens movement, the method further includes: converting, by the OIS controller or the EIS controller, the movement information of the lens into a lens movement pixel compensation amount; and the performing, by the EIS controller by using the movement information of the lens collected by the Hall effect sensor and the motion data, jitter compensation on the image sequence collected by the image sensor includes: performing, by the EIS controller by using the lens movement pixel compensation amount and the motion data, jitter compensation on the image sequence collected by the image sensor.

In this embodiment of this application, the OIS controller may convert the movement information of the lens into the lens movement pixel compensation amount, the EIS controller may also convert the movement information of the lens into the lens movement pixel compensation amount, and an ISP may also convert the movement information of the lens into the movement pixel compensation amount. In other words, the Hall effect sensor may collect only physical movement data of the lens, and the OIS controller, the EIS controller, or the ISP converts the physical movement data of the lens into a lens movement pixel compensation amount.

In some implementations, the performing, by the EIS controller by using the lens movement pixel compensation amount and the motion data, jitter compensation on the image sequence collected by the image sensor includes: determining, by the EIS controller based on the motion data, a motion pixel compensation amount of the image sequence collected by the image sensor; subtracting, by the EIS controller, the lens movement pixel compensation amount from the motion pixel compensation amount to obtain an image sequence pixel compensation amount; and performing, by the EIS controller by using the image sequence pixel compensation amount, jitter compensation on the image sequence collected by the image sensor.

In this embodiment of this application, the EIS controller can determine the motion pixel compensation amount of the image sequence based on the motion data. However, the lens has been moved during collection of the image sequence, and specific lens movement is reflected by the lens movement pixel compensation amount. Therefore, in a process of performing pixel compensation by the EIS controller, the lens movement pixel compensation amount needs to be subtracted, so that no over-compensation occurs, and image stability is improved.

In some implementations, before the performing, by the EIS controller by using movement information of the lens and the motion data, jitter compensation on the image sequence collected by the image sensor, the method further includes: obtaining, by the OIS controller, the motion data and the movement information of the lens by using a frame synchronization (vsync) signal; and sending, by the OIS controller, the motion data and the movement information of the lens to the EIS controller; and the performing, by the EIS controller by using movement information of the lens and the motion data, jitter compensation on the image sequence collected by the image sensor includes: performing, by the EIS controller by using the motion data and the movement information of the lens that are sent by the OIS controller and obtained based on the frame synchronization signal, jitter compensation on the image sequence collected by the image sensor.

Optionally, the EIS controller may obtain the motion data and the movement information of the lens by using a frame synchronization signal, and the EIS controller may send the obtained motion data to the OIS controller. Alternatively, an ISP may obtain the motion data and the movement information of the lens by using a frame synchronization signal, and the ISP sends the motion data to the OIS controller and the EIS controller, and sends the movement information of the lens to the EIS controller.

In some implementations, the terminal device further includes an image signal processor ("ISP" for short), and the sending, by the OIS controller, the motion data and the movement information of the lens to the EIS controller includes: sending, by the OIS controller, the motion data and the movement information of the lens to the EIS by using the ISP; and that the EIS receives the motion data and the movement information of the lens that are sent by the OIS and obtained based on the vsync signal includes: receiving, by the EIS by using the ISP, the motion data and the movement information of the lens that are sent by the OIS and obtained based on the vsync signal.

In some implementations, after the collecting, by the image sensor, an image sequence based on the movement of the lens, the method further includes: sending, by the image sensor, the collected image sequence to the ISP; and receiving, by the ISP, the collected image sequence sent by the sensor, and sending the image sequence collected by the sensor to the EIS.

In some implementations, the motion data includes: rotation data of the terminal device on an X-axis, a Y-axis, and a Z-axis, and/or translation data of the terminal device on the X-axis and the Y-axis.

The motion data may be rotation data or translation data of the terminal device on a particular axis, and when the terminal device does not move on an axis, it is considered that motion data on the axis is o.

In some implementations, the motion sensor includes a gyroscope, an accelerometer, and/or the like.

According to a second aspect, a terminal device is provided. The terminal device includes a motion sensor, an optical image stabilization OIS controller, an electronic image stabilization EIS controller, and an image sensor. The motion sensor is configured to: when the terminal device moves, collect motion data of the terminal device, and send the motion data to the OIS controller and the EIS controller. The OIS controller is configured to control, based on the motion data, a lens of the terminal device to move. The image sensor is configured to collect an image sequence. The EIS controller is configured to perform, by using movement information of the lens and the motion data, jitter compensation on the image sequence collected by the image sensor.

In some implementations, the terminal device further includes: a Hall effect sensor, configured to collect the movement information of the lens before the EIS controller performs, by using the movement information of the lens and the motion data, jitter compensation on the image sequence collected by the image sensor; and the EIS controller is specifically configured to perform, by using the movement information of the lens collected by the Hall effect sensor and the motion data, jitter compensation on the image sequence collected by the image sensor.

In some implementations, the OIS controller or the EIS controller is further configured to: after the Hall effect sensor collects the movement information of the lens movement, convert the movement information of the lens into a lens movement pixel compensation amount; and the EIS controller is further specifically configured to perform, by using the lens movement pixel compensation amount and the motion data, jitter compensation on the image sequence collected by the image sensor.

In some implementations, the EIS controller is further specifically configured to: determine, based on the motion data, a motion pixel compensation amount of the image sequence collected by the image sensor; subtract the lens movement pixel compensation amount from the motion pixel compensation amount to obtain an image sequence pixel compensation amount; and perform, by using the image sequence pixel compensation amount, jitter compensation on the image sequence collected by the image sensor.

In some implementations, the OIS controller is further configured to: before the EIS controller performs, by using the movement information of the lens and the motion data, jitter compensation on the image sequence collected by the image sensor, obtain the motion data and the movement information of the lens by using a frame synchronization signal, and send the motion data and the movement information of the lens to the EIS controller; and the EIS controller is further specifically configured to: perform, by using the motion data and the movement information of the lens that are sent by the OIS controller and obtained based on the frame synchronization signal, jitter compensation on the image sequence collected by the image sensor.

In some implementations, the terminal device further includes an image signal processor ISP, and the OIS controller is further configured to send the motion data and the movement information of the lens to the EIS controller by using the ISP; and the EIS controller is specifically configured to receive, by using the ISP, the motion data and the movement information of the lens that are sent by the OIS controller and obtained based on the frame synchronization signal.

In some implementations, the image sensor is further configured to: after collecting the image sequence, send the collected image sequence to the ISP; and the ISP is configured to: receive the collected image sequence sent by the image sensor, and send the image sequence collected by the image sensor to the EIS controller.

In some implementations, the motion data includes: rotation data of the terminal device on an X-axis, a Y-axis, and a Z-axis, and/or translation data of the terminal device on the X-axis and the Y-axis.

According to a third aspect, a computer readable medium is provided, configured to store a computer program. The computer program includes an instruction used to perform the method in any one of the first aspect or the possible implementations of the first aspect.

BRIEF DESCRIPTION OF THE DRAWINGS

FIG. 7 is a schematic diagram of an image obtaining method according to an embodiment of this application;
FIG. 8 is a schematic block diagram of a terminal device according to an embodiment of this application.

DETAILED DESCRIPTION OF ILLUSTRATIVE EMBODIMENTS

The technical solutions in the embodiments of this application may be applied to a terminal (Terminal) device. The terminal device may be but is not limited to a mobile station (MS), a mobile terminal, a mobile phone, a handset, a portable device, and the like, and may communicate with one or more core networks by using a radio access network (RAN). The terminal device may be a mobile terminal such as a mobile phone (or referred to as a "cellular" phone) or a computer having a mobile terminal, for example, may be a portable, pocket-sized, handheld, computer built-in, or in-vehicle mobile terminal that exchanges language and/or data with the radio access network. Alternatively, the terminal device may be various products having a touchscreen, for example, a tablet computer, a touchscreen phone, a touchscreen device, and a mobile phone terminal, and this is not limited herein. Further, the terminal device may be a device with a photographing function, for example, a mobile phone having a camera, a tablet computer, or another device with a photographing function.

An EIS technology and an OIS technology that are used in the embodiments of this application are briefly described below.

The OIS technology is to correct an "optical axis deviation" by moving a lens. A principle of the OIS technology is as follows: A gyroscope in the lens detects tiny movement, and then transmits a signal to a microprocessor; and the microprocessor calculates displacement required for compensation, and performs compensation based on a shaking direction of the lens and the displacement by using a compensation lens group, to effectively avoid image blurring caused by camera shaking.

Figure 1:
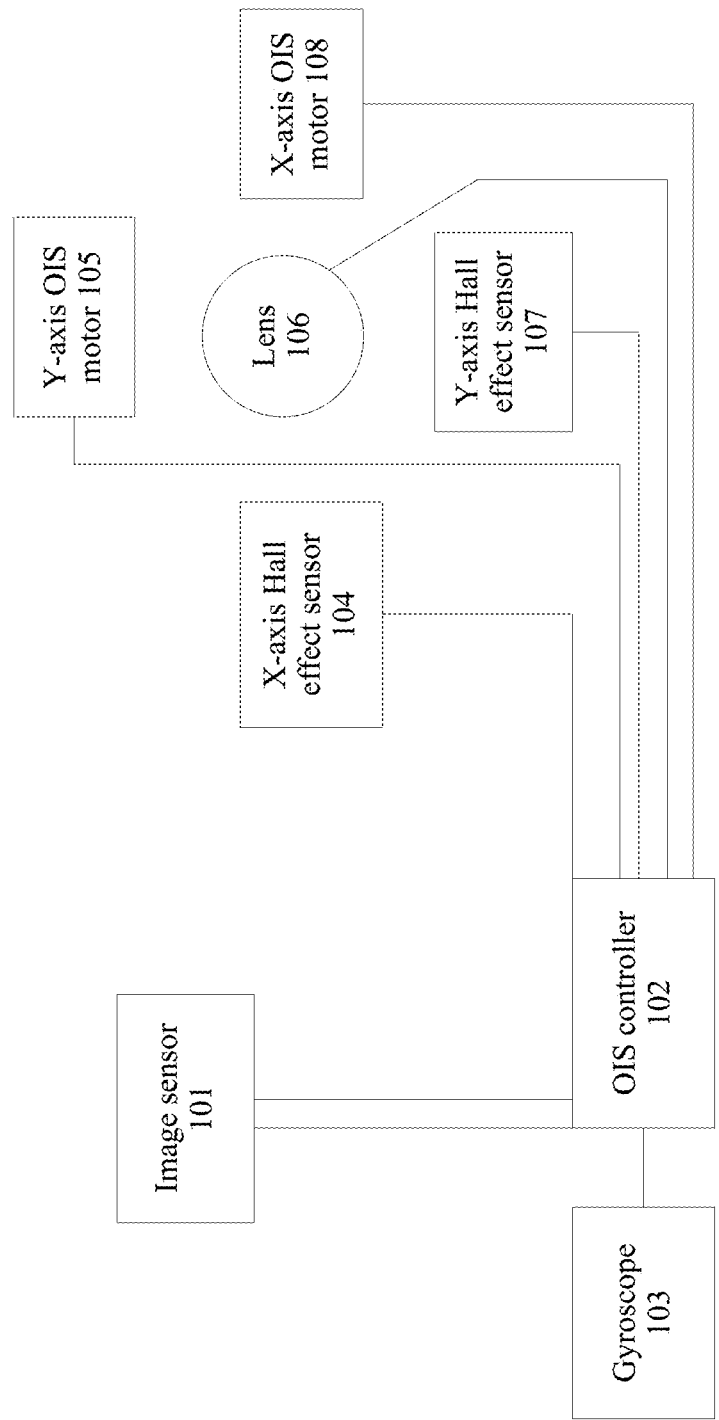
FIG. 1 is a schematic block diagram of an OIS system according to an embodiment of this application.

For example, FIG. 1 is a schematic block diagram of an OIS system 100. The OIS system 100 includes an image sensor 101, an OIS controller 102, a gyroscope 103, an X-axis Hall effect sensor 104, a Y-axis Hall effect sensor 107, a Y-axis OIS motor 105, an X-axis OIS motor 108, and a lens 106. Specifically, when a terminal device moves during exposure, the image sensor 101 is configured to: sense light, convert an optical signal into an analog image signal, convert the analog image into a data image, and then send the data image to an image processor for processing. The OIS controller 102 reads data from the gyroscope 104 to obtain motion data of the terminal device. Based on the motion data, the OIS controller 102 drives the X-axis OIS motor 108 to move the lens 106 in an X-axis direction, and drives the Y-axis OIS motor 105 to move the lens 106 in a Y-axis direction. The X-axis Hall effect sensor 104 detects movement of the lens 106 in the X-axis direction, and the X-axis Hall effect sensor 104 transmits, to the OIS controller 102, a real-time position of the lens 106 during movement in the X-axis direction. The Y-axis Hall effect sensor 107 detects movement of the lens 106 in the Y-axis direction, and the Y-axis Hall effect sensor 107 transmits, to the OIS controller 102, a real-time position of the lens 106 during movement in the Y-axis direction. The OIS controller 102 continues to push the lens 106 based on a new position of the lens 106 and new motion data that is obtained by the gyroscope 103, thereby continuously implementing closed-loop control.

Figure 2:
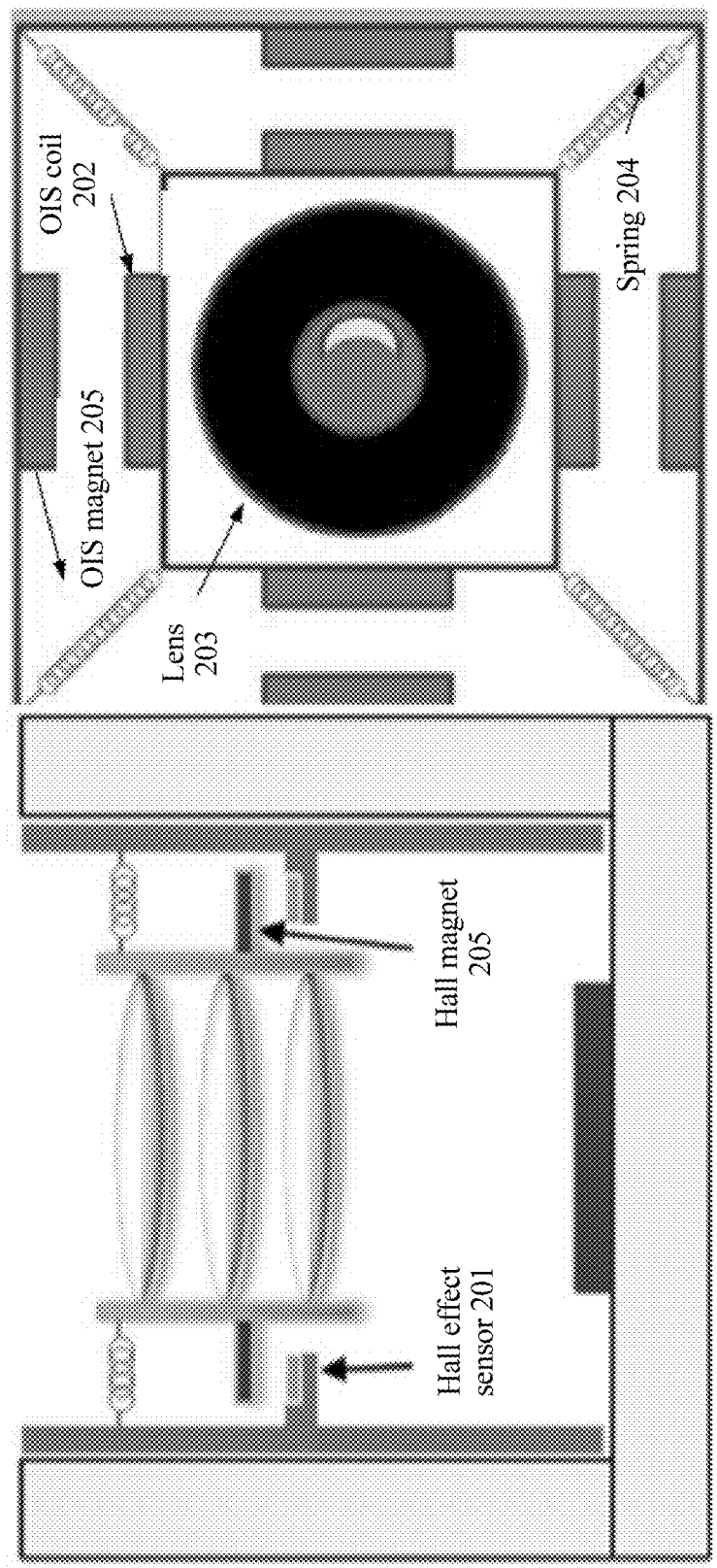
FIG. 2 is a schematic diagram of an OIS module according to an embodiment of this application.

More specifically, an OIS module 200 shown in FIG. 2 may include a Hall effect sensor 201, an OIS coil 202, a lens 203, a spring 204, a Hall magnet 205, an OIS magnet 206, and the like. For example, the lens 203 may be the lens 107 in FIG. 1, and the Hall effect sensor 201 may be the X-axial Hall effect sensor 105 and/or the Y-axis Hall effect sensor 108 in FIG. 1. A left part of FIG. 2 shows a side view of the OIS module 200, and a right part of FIG. 2 shows a top view of the OIS module 200. Specifically, the lens 203 is suspended in the module by using the spring 204. When the OIS controller 103 needs to push the lens 203, the OIS controller 103 controls a current on the OIS coil 202, so that an electromagnetic effect is generated and magnetic force is generated between the OIS controller 102 and the OIS coil 206 in the module 200, to push the lens 203 to move. As the lens 203 moves, a position of the Hall magnet 205 on the lens changes. The Hall effect sensor 201 inside the module can detect real-time movement of the lens 203, and transmit a Hall signal to the OIS controller 103. OIS compensation includes: translating the lens 203, deflecting the lens 203, moving the image sensor 105, or the like.

Figure 3:
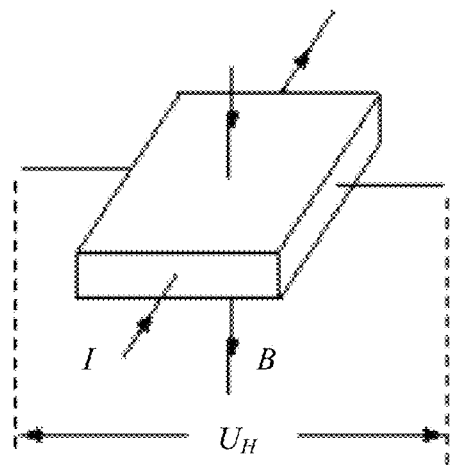
FIG. 3 is a schematic diagram of a measurement principle of a Hall effect sensor.

Still further, FIG. 3 shows a principle of measuring movement information of a lens by a Hall effect sensor. A control current I exists between both ends of a semiconductor sheet, and a uniform magnetic field with magnetic induction intensity B is applied in a vertical direction of the sheet. In this case, a Hall voltage with an electric potential difference UH is generated in a direction perpendicular to the current and the magnetic field. This phenomenon is referred to as a Hall effect, and the Hall effect is generated when Lorentz force is exerted on a moving charge in a magnetic field. As the lens 203 in FIG. 2 moves, the Hall magnet 205 is driven to move, so that magnetic field intensity sensed by the Hall effect sensor 201 changes, and a Hall voltage output by the Hall effect sensor 201 also changes accordingly. In a linear travel range, a voltage change is proportional to a displacement value, so that a movement distance of the lens can be measured by using output of the Hall effect sensor 201.

Figure 4:
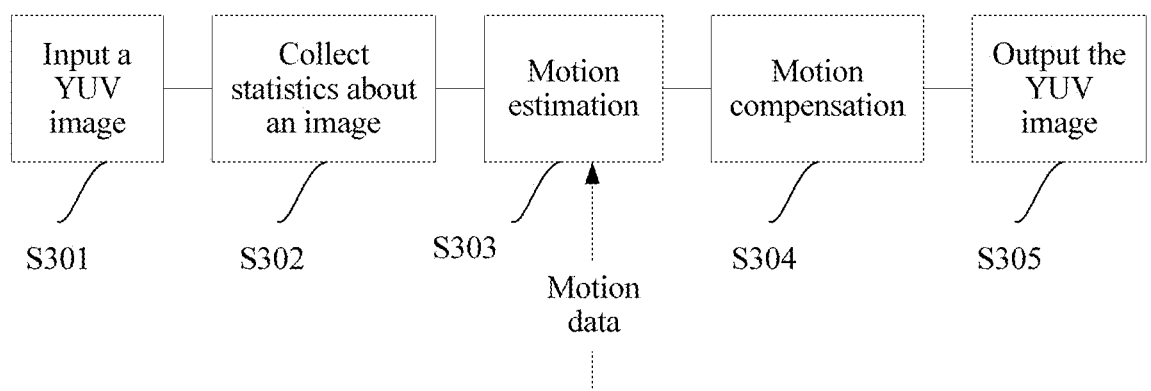
FIG. 4 is a schematic diagram of an EIS system according to an embodiment of this application.

The EIS technology is a processing process of removing, by an electronic device by using a digital image processing technology, image disturbance introduced in a video image sequence due to irregular random motion of a camera, to stabilize an image sequence. An objective of the EIS technology is to eliminate or reduce motion between image sequence frames that is caused by camera shaking, so as to obtain a stable and clear image. One type of EIS technology is image stabilization processing based on image content in which a motion status of an image is identified based on content of two adjacent image frames, and after images are registered and aligned with each other, processing such as clipping, stretching, or deformation is appropriately performed to generate a relatively stable image sequence. Disadvantages of this method are: a large amount of calculation, a low speed, and high power consumption. The other type of EIS technology is image stabilization processing based on motion sensor data in which a motion status between frames and a motion status inside a frame of image are calculated based on motion sensor data that is obtained during exposure of each frame of image, and images are registered and then processing such as clipping, stretching, or deformation is appropriately performed to generate a relatively stable image sequence. Such an algorithm has a high speed and low power consumption. For example, FIG. 4 is a schematic diagram of an image processing process 300 of an EIS system. The process 300 includes five steps:

S301. Input a YUV image, where Y indicates luminance (Luminance or Luma), in other words, a grayscale value, and U and V indicate chrominance (Chrominance or Chroma); or input an RGB image, where R indicates red (Red), G indicates green (Green), and B indicates blue (Blue).

S302. Collect statistics about an input image sequence.

S303. Perform motion estimation on the image sequence by using motion data collected by a Hall effect sensor 201, to obtain an image motion estimation amount.

S304. Perform motion compensation by using the motion estimation obtained in S303, to obtain a processed YUV image.

S305. Output the YUV image.

Figure 5:
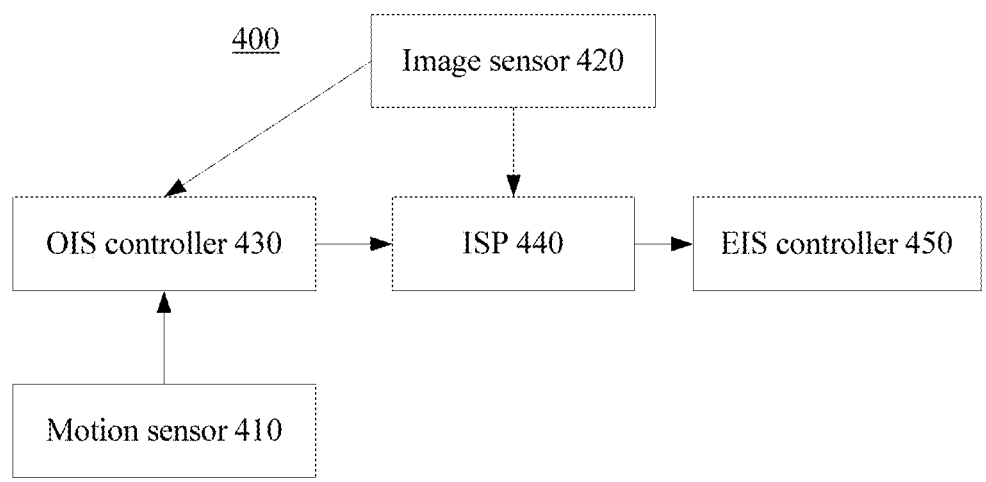
FIG. 5 is a schematic diagram of an application scenario according to an embodiment of this application.

FIG. 5 is a schematic diagram of an application scenario 400 according to an embodiment of this application. The application scenario includes: a motion sensor 410, an image sensor 420, an OIS controller 430, an ISP 440, and an EIS controller 450.

The motion sensor 410 is configured to collect motion data of a terminal device, and send the collected motion data to the OIS controller 430. The motion data may include rotation data of the terminal device in at least one of an X-axis direction, a Y-axis direction, and a Z-axis direction, or the motion data may include translation data of the terminal device in an X-axis direction and/or a Y-axis direction. The motion sensor 410 may be a gyroscope, an accelerometer, or the like. Optionally, the motion sensor 410 may be a tri-axis gyroscope, a tri-axis accelerometer, or the like.

The image sensor 420 is configured to collect image data and send the collected image data to the ISP 44. Optionally, the image data collected by the image sensor 420 is image data on which compensation has been performed by using an OIS technology. To be specific, a lens of the terminal device has been moved by using the OIS technology at a moment when the image sensor 410 collects the image data. The image data in this embodiment of this application may be data such as a photo or a video. For example, the image sensor 420 may be a charge-coupled device ("CCD" for short) or may be a light-sensitive element (Complementary Metal Oxide Semiconductor, "COMS" for short).

The OIS controller 430 is configured to move the lens of the terminal device based on the motion data of the terminal device collected by the motion sensor 410. The OIS controller 430 is further configured to: extract motion data and movement information of the lens of the terminal device during exposure of each frame of image based on a frame synchronization (vsync) signal, and send motion sensor data and the movement information of the lens of the terminal device that are extracted based on the frame synchronization signal to the ISP 440.

The ISP 440 is configured to receive the motion data and the movement information of the lens of the terminal device that are sent by the OIS controller 430, and is further configured to: receive the image data sent by the image sensor 420, and send the received motion data, the received movement information of the lens, and the received image data to the EIS controller 450.

The EIS controller 450 is configured to: receive the motion data, the movement information of the lens, and the image data that are sent by the ISP 440, and perform jitter compensation on the image data based on the motion data and the movement information of the lens, to obtain compensated image data.

Figure 6:
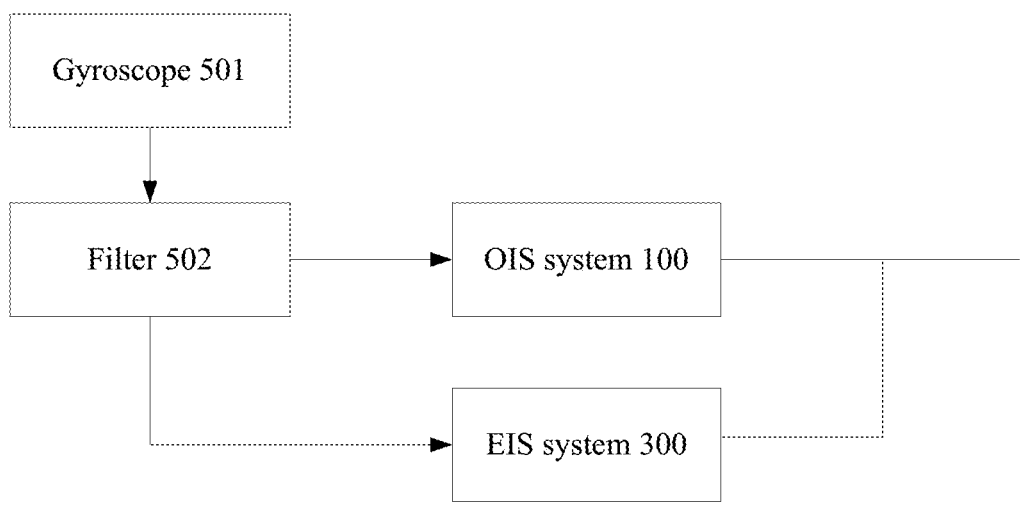
FIG. 6 is a schematic diagram of an image obtaining method in the prior art.

In the prior art, as shown in FIG. 6, jitter compensation is performed on each frame of image by using an OIS technology and an EIS technology. Specifically, after an OIS controller is enabled, optical image stabilization compensation is performed based on motion data collected by a gyroscope 501. A motion sensor 410 may be the gyroscope 501, and the gyroscope 501 may be a gyroscope 103 in an OIS system. Jitter in each frame of image decreases. Therefore, jitter between two frames decreases. However, the EIS controller and the OIS controller receive same motion sensor data. If the EIS controller performs inter-frame jitter compensation on an image based on the motion sensor data, a compensation amount of the jitter compensation is greater than an actual difference between two frames of images, and overcompensation occurs, thereby resulting in distortion of a collected image. Jitter for which the OIS performs compensation is usually lower than 10 Hz and less than 1 degree, but the EIS can perform compensation for jitter in a larger range. A principle of the OIS technology is to separate motion sensor signals by using a filter 502, and transmit a motion signal lower than 10 Hz and less than 1 degree to an OIS system 100 and transmit another signal to an EIS system 300. After signals with small jitter are transmitted to the OIS system 100, the OIS system 100 may not necessarily compensate for all of the signals. However, the EIS system 300 can compensate for only a signal obtained after separation. Therefore, after the OIS system 100 and the EIS system 300 are used to jointly perform compensation, under-compensation may occur, thereby resulting in a poor overall image stabilization effect. In addition, filtering may cause a signal loss. Consequently, the OIS system 100 may not necessarily receive all motion signals that can be compensated for by the OIS system 100, and the EIS system 300 may not necessarily receive all motion signals that can be compensated for by the EIS system 300. A final actual compensation amount does not match an actual motion status. Consequently, an overall image stabilization effect is poor.

In this embodiment of this application, the OIS controller moves the lens of the terminal device based on the motion data collected by the motion sensor, so that when the image sensor collects an image sequence, an optical path is kept stable and unchanged as much as possible, and a clear exposed image sequence is obtained. Controlling, by the OIS controller, the lens to move may be referred to as first compensation. The EIS controller performs, based on the motion data and the movement information that is obtained after the OIS controller controls the lens to move, jitter compensation on the image sequence collected by the image sensor. This can be referred to as second compensation. In the prior art, an OIS controller performs jitter compensation on an image sequence based on motion data, and an EIS controller also performs jitter compensation on the image sequence based on the motion data. In other words, the same motion data is used to compensate for the image sequence twice in the prior art. However, in this embodiment of this application, the first compensation in the OIS technology is considered when the second compensation is performed on the image sequence by using the EIS technology, so that overcompensation in the prior art can be avoided and image stability can be improved.

FIG. 7 shows an image obtaining method 600 according to an embodiment of this application. A terminal device includes a motion sensor, an optical image stabilization OIS controller, an electronic image stabilization EIS controller, a lens, and an image sensor. The method 600 includes the following steps.

S610. When the terminal device moves, the motion sensor collects motion data of the terminal device, and sends the motion data to the OIS controller and the EIS controller. For example, during exposure of each frame, the motion sensor obtains the motion data of the terminal device at a frequency of at least 3 kHz.

S620. The OIS controller receives the motion data, and controls movement of the lens of the terminal device based on the motion data. For example, the OIS controller pushes the lens at a frequency of at least 10 kHz.

S630. The image sensor movably collects an image sequence.

It should be understood that in S630, the image sequence may be collected based on an image collection period.

Optionally, the OIS controller obtains the motion data and movement information of the lens by using a frame synchronization signal, and the OIS controller sends the motion data and the movement information of the lens to the EIS controller. The frame synchronization signal may detect start and end of exposure of a frame of image, and motion data corresponding to each frame of image and movement information of the image sensor when the image sensor collects each frame of image may be extracted by using the frame synchronization signal. To be specific, each frame of image, the motion data corresponding to each frame of image, and the movement information of the lens corresponding to each frame of image may be matched by using the frame synchronization signal. The OIS controller may send the motion data and the movement information of the lens that are obtained by using the frame synchronization signal to the EIS controller, and the EIS controller performs jitter compensation on the image sequence by using the matched motion data and movement information of the lens.

In an optional embodiment, the terminal device further includes an ISP, and the sending, by the OIS controller, the motion data and the movement information of the lens to the EIS controller includes: sending, by the OIS controller, the motion data and the movement information of the lens to the EIS controller by using the ISP; and that the EIS controller receives the motion data and the movement information of the lens that are sent by the OIS and obtained based on the frame synchronization signal includes: receiving, by the EIS controller by using the ISP, the motion data and the movement information of the lens that are sent by the OIS and obtained based on the frame synchronization signal.

In an optional embodiment, after the collecting, by the image sensor, an image sequence based on the movement of the lens, the method 600 further includes: sending, by the image sensor, the collected image sequence to the ISP; and receiving, by the ISP, the collected image sequence sent by the sensor, and sending the image sequence collected by the image sensor to the EIS controller.

Optionally, the EIS controller or the ISP may alternatively obtain the motion data by using a frame synchronization signal, and the EIS controller or the ISP may send the obtained motion data to the OIS controller, so that the OIS controller controls, based on the motion data, the lens to move. Then the EIS controller may obtain the motion data and the movement information of the lens by using the frame synchronization signal, and perform jitter compensation on the image sequence based on the motion data and the movement information of the lens.

S640. The EIS controller performs, by using movement information of the lens and the motion data, jitter compensation on the image sequence collected by the image sensor.

Optionally, the terminal device includes a Hall effect sensor. After S620 and before S640, the method 600 further includes: collecting, by the Hall effect sensor, the movement information of the lens. S640 includes: performing, by the EIS controller by using the movement information of the lens collected by the Hall effect sensor and the motion data, jitter compensation on the image sequence collected by the image sensor.

Optionally, the OIS controller or the EIS controller converts the movement information of the lens into a lens movement pixel compensation amount. The performing, by the EIS controller by using the movement information of the lens collected by the Hall effect sensor and the motion data, jitter compensation on the image sequence collected by the image sensor includes: performing, by the EIS controller by using the lens movement pixel compensation amount and the motion data, jitter compensation on the image sequence collected by the image sensor.

In an example, that the movement information of the lens is converted into the lens movement pixel compensation amount may be as follows: The Hall effect sensor learns, through calculation, that the lens respectively moves x um (micrometers) and y um (micrometers) in an X-axis direction and a Y-axis direction. A size of each pixel on the image sensor corresponds to p um, where p usually ranges from a few tenths micrometer to several micrometers. Image sensors of different models have different pixel sizes. In this case, corresponding pixel compensation amounts when the lens moves x um on an X-axis and y um on a Y-axis are x/p pixels and y/p pixels.

Specifically, the performing, by the EIS controller by using the lens movement pixel compensation amount and the motion data, jitter compensation on the image sequence collected by the image sensor includes: determining, by the EIS controller based on the motion data, a motion pixel compensation amount of the image sequence collected by the image sensor; subtracting, by the EIS controller, the lens movement pixel compensation amount from the motion pixel compensation amount to obtain an image sequence pixel compensation amount; and performing, by the EIS controller by using the image sequence pixel compensation amount, jitter compensation on the image sequence collected by the image sensor. For example, that the OIS controller controls to convert the movement of the lens into the lens movement pixel compensation amount is that the lens moves x1 pixels in the X-axis direction and y1 pixels on the Y-axis. The EIS controller learns, through calculation based on motion data of a current frame and motion data of at least one frame of image before and after the current frame, that x2 pixels need to be compensated for the current frame on the X-axis, and y2 pixels need to be compensated for the current frame on the Y-axis. In this case, the EIS controller finally determines that an actual pixel compensation amount of the current frame on the X-axis is x2-x1 pixels, and an actual pixel compensation amount on the Y-axis is y2-y1 pixels.

In an example, a method for calculating a pixel compensation amount by the EIS may be as follows: Assuming that a gyroscope signal is a lens shake angular velocity signal $\omega$, a lens deflection angle $\theta$ may be calculated by detecting an angular velocity signal during exposure of each frame and performing an integral operation; assuming that an equivalent focal length of the lens is f, a distance that imaging of an object moves relative to the image sensor is f·tan $\theta$; and assuming that a pixel size of the image sensor is p, an image motion pixel quantity caused by the lens deflection angle $\theta$ is (f·tan $\theta$)/p pixels. The EIS calculates an image motion pixel quantity of each frame of image caused by lens shaking. If an $N^{th}$ frame of image has n jitter pixels, an $(N+1)^{th}$ frame of image has m jitter pixels, and an $(N-1)^{th}$ frame of image has one jitter pixel, a quantity of pixels that need to be compensated for the $N^{th}$ frame of image is f(m,n,l), where f(·) is a video stabilization calculation function.

Therefore, the OIS controller can determine the motion pixel compensation amount of the image sequence based on the motion data. However, the lens has been moved during collection of the image sequence, and specific lens movement is reflected by the lens movement pixel compensation amount. Therefore, in a process of performing pixel compensation by the EIS controller, the lens movement pixel compensation amount needs to be subtracted, so that no over-compensation occurs, and image stability is improved.

Figure 9:
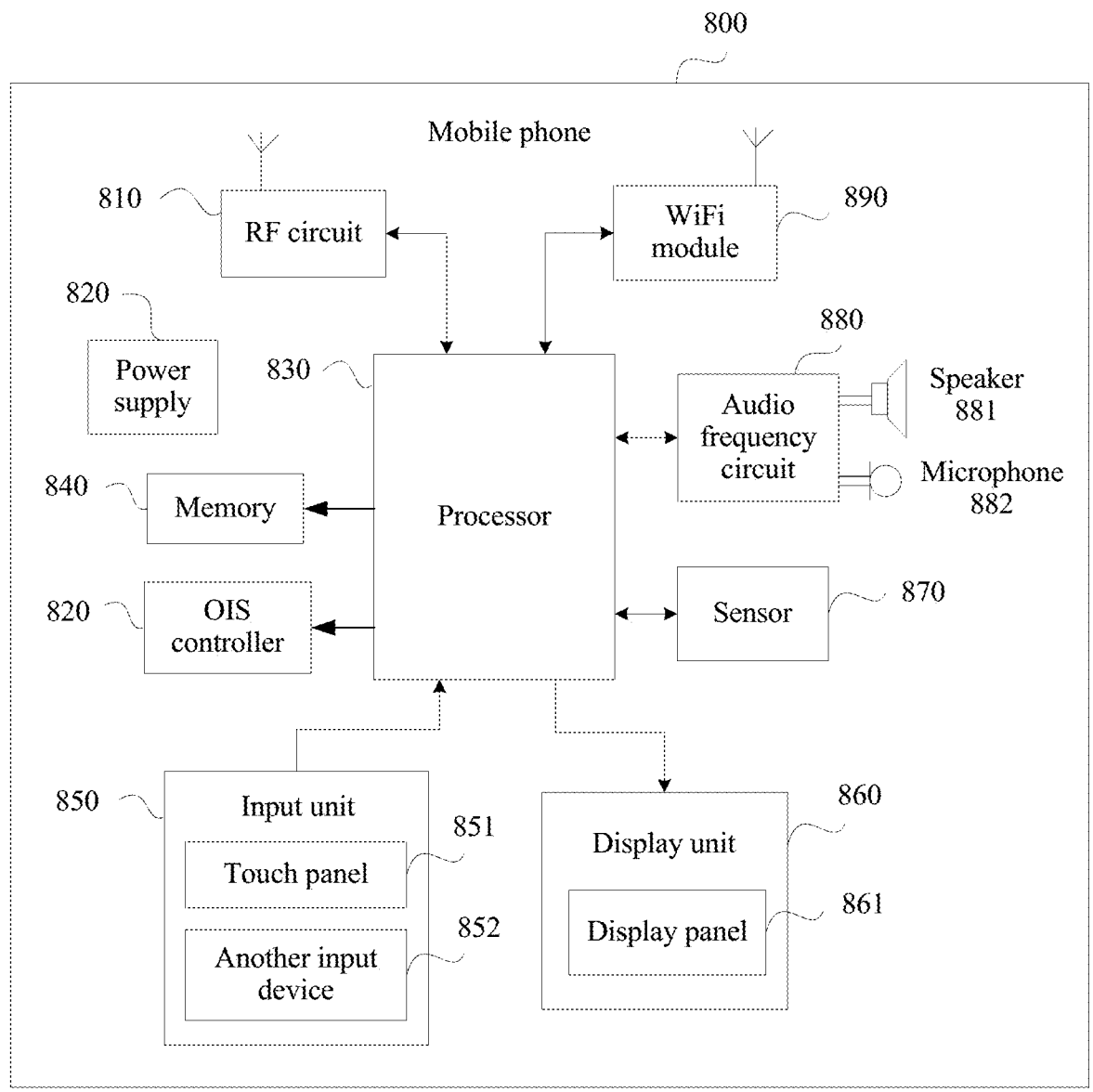
FIG. 9 is a schematic block diagram of another terminal device according to an embodiment of this application.

The foregoing describes the image obtaining method in the embodiments of this application with reference to FIG. 7, and the following describes a terminal device in embodiments of this application with reference to FIG. 8 and FIG. 9.

FIG. 8 is a schematic diagram of a terminal device 700 according to an embodiment of this application. The terminal device 700 includes a motion sensor 710, configured to: when the terminal device moves, collect motion data of the terminal device, and send the motion data to the OIS controller and the EIS controller. The optical image stabilization OIS controller 720, is configured to control, based on the motion data, a lens of the terminal device to move. An image sensor 730 is configured to collect an image sequence. The electronic image stabilization EIS controller 740, is configured to perform, by using movement information of the lens and the motion data, jitter compensation on the image sequence collected by the image sensor.

In an optional embodiment, the terminal device 700 further includes: a Hall effect sensor 750, configured to collect the movement information of the lens before the EIS controller performs, by using the movement information of the lens and the motion data, jitter compensation on the image sequence collected by the image sensor, and the EIS controller 330 is specifically configured to perform, by using the movement information of the lens collected by the Hall effect sensor and the motion data, jitter compensation on the image sequence collected by the image sensor.

In an optional embodiment, the OIS controller 720 or the EIS controller 730 is further configured to: after the Hall effect sensor 750 collects the movement information of the lens movement, convert the movement information of the lens into a lens movement pixel compensation amount; and the EIS controller 730 is further specifically configured to perform, by using the lens movement pixel compensation amount and the motion data, jitter compensation on the image sequence collected by the image sensor.

In an optional embodiment, the EIS controller 730 is further specifically configured to: determine, based on the motion data, a motion pixel compensation amount of the image sequence collected by the image sensor; subtract the lens movement pixel compensation amount from the motion pixel compensation amount to obtain an image sequence pixel compensation amount; and perform, by using the image sequence pixel compensation amount, jitter compensation on the image sequence collected by the image sensor.

In an optional embodiment, the OIS controller 720 is further configured to: before the EIS controller 330 performs, by using the movement information of the lens and the motion data, jitter compensation on the image sequence collected by the image sensor, obtain the motion data and the movement information of the lens by using a frame synchronization signal; and send the motion data and the movement information of the lens to the EIS controller 730; and the EIS controller 730 is further specifically configured to: perform, by using the motion data and the movement information of the lens that are sent by the OIS controller 720 and obtained based on the frame synchronization signal, jitter compensation on the image sequence collected by the image sensor.

In an optional embodiment, the terminal device 700 further includes an image signal processor ISP 760. The OIS controller 720 is further configured to send the motion data and the movement information of the lens to the EIS controller 730 by using the ISP, and the EIS controller 730 is specifically configured to receive, by using the ISP, the motion data and the movement information of the lens that are sent by the OIS controller 720 and obtained based on the frame synchronization signal.

In an optional embodiment, the image sensor 740 is further configured to: after collecting the image sequence, send the collected image sequence to the ISP; and the ISP is configured to: receive the collected image sequence sent by the image sensor, and send the image sequence collected by the image sensor to the EIS controller 730.

In an optional embodiment, the motion data includes: rotation data of the terminal device on an X-axis, a Y-axis, and a Z-axis, and/or translation data of the terminal device on the X-axis and the Y-axis.

A mobile phone is used as an example of a terminal device. FIG. 9 is a block diagram of a partial structure of a mobile phone 100 related to an embodiment of this application. As shown in FIG. 9, the mobile phone 400 may include components such as a radio frequency (Radio Frequency, RF) circuit 810, a power supply 820, a processor 830, a memory 840, an input unit 850, a display unit 860, a sensor 870, an audio frequency circuit 880, an OIS controller 820, and a Wireless Fidelity ("WiFi" for short) module 890. It should be understood that the structure of the mobile phone shown in FIG. 8 constitutes no limitation on the mobile phone, and the mobile phone may include more or fewer components than those shown in the figure, or combine some components, or have different component arrangements. The processor 830 may include an EIS controller 830 and/or an ISP 440.

Each constituent component of the mobile phone 800 is specifically described below with reference to FIG. 9.

The RF circuit 810 may be configured to: receive and send information, or receive and send a signal during a call. Particularly, after receiving downlink information of a base station, the RF circuit 810 sends the downlink information to the processor 830 for processing, and in addition, sends related uplink data to the base station. Generally, the RF circuit includes but is not limited to: an antenna, at least one amplifier, a transceiver, a coupler, a low noise amplifier (LNA), a duplexer, and the like. In addition, the RF circuit 810 may further communicate with a network and another device through wireless communication. The wireless communication may use any communications standard or protocol that includes but is not limited to: the Global System for Mobile Communications (GSM), General Packet Radio Service (GPRS), Code Division Multiple Access (CDMA), Wideband Code Division Multiple Access (WCDMA), Long Term Evolution (LTE), an email, a short message service (SMS), and the like.

The memory 840 may be configured to store a software program and a module. The processor 830 executes various functional applications and data processing of the mobile phone 800 by running the software program and the module that are stored in the memory 840. The memory 840 may mainly include a program storage area and a data storage area. The program storage area may store an operating system, an application program required by at least one function (such as a sound play function or an image play function), and the like. The data storage area may store data (such as audio data or a phone book) created based on use of the mobile phone 800, and the like. In addition, the memory 840 may include a high-speed random access memory, or may include a nonvolatile memory, such as at least one magnetic disk storage device, a flash memory component, or another volatile solid-state storage device.

The input unit 850 may be configured to: receive input digital or character information, and generate key signal input related to a user setting and function control of the mobile phone 800. Specifically, the input unit 850 may include a touch panel 851 and another input device 852. The touch panel 851, also referred to as a touchscreen, can collect a touch operation (for example, an operation performed by a user on the touch panel 851 or near the touch panel 851 by using any proper object or accessory such as a finger or a stylus) of the user on or near the touch panel 851, and drive a corresponding connection apparatus based on a preset program. Optionally, the touch panel 851 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and sends the touch point coordinates to the processor 830, and can receive and execute a command sent by the processor 830. In addition, the touch panel 851 may be implemented by using a plurality of types, such as a resistive type, a capacitive type, infrared, and a surface acoustic wave. In addition to the touch panel 851, the input unit 850 may include the another input device 852. Specifically, the another input device 852 may include but is not limited to one or more of a physical keyboard, a function key (such as a volume control key or an on/off key), a trackball, a mouse, a joystick, and the like.

The display unit 860 may be configured to display information input by the user or information provided for the user and various menus of the mobile phone 800. The display unit 860 may include a display panel 861. Optionally, the display panel 861 may be configured in a form of an LCD, an OLED, or the like. Further, the touch panel 851 may cover the display panel 861. When detecting the touch operation on or near the touch panel 851, the touch panel 851 transmits the touch operation to the processor 830 to determine a type of a touch event, and then the processor 830 provides corresponding visual output on the display panel 861 based on the type of the touch event. Although the touch panel 851 and the display panel 851 in FIG. 8 are used as two independent components to implement input and input functions of the mobile phone 800, in some embodiments, the touch panel 851 and the display panel 861 may be integrated to implement the input and output functions of the mobile phone 800.

The mobile phone 800 may further include at least one type of sensor 870, such as a light sensor, a motion sensor 410, an image sensor 420, or another sensor. Specifically, the light sensor may include an ambient light sensor and a proximity sensor. The ambient light sensor may adjust luminance of the display panel 861 based on brightness or dimness of ambient light. The proximity sensor may close the display panel 861 and/or backlight when the mobile phone 800 approaches an ear. As a type of motion sensor, an accelerometer sensor may detect a value of an acceleration in each direction (usually, three axes), may detect a value and a direction of gravity when the mobile phone is static, and may be applied to an application for identifying a mobile phone posture (such as landscape-to-portrait switch, a related game, and magnetometer posture calibration), a function related to vibration identification (such as a pedometer or a stroke), or the like. A gyroscope, a barometer, a hygrometer, a thermometer, an infrared sensor, and another sensor that may be further configured on the mobile phone 800 are not described herein.

The audio frequency circuit 880, a speaker 881, and a microphone 882 may provide an audio interface between the user and the mobile phone 800. The audio frequency circuit 880 may transmit, to the speaker 881, an electrical signal converted from received audio data, and the speaker 881 converts the electrical signal into a sound signal for output. Further, the microphone 882 converts a collected sound signal into an electrical signal, and the audio frequency circuit 480 receives the electrical signal, converts the electrical signal into audio data, and outputs the audio data to the RF circuit 810 to send the audio data to, for example, another mobile phone, or outputs the audio data to the memory 840 for further processing.

WiFi is a short-distance wireless transmission technology. By using the WiFi module 890, the mobile phone 800 may help the user receive and send an email, browse a web page, access streaming media, and so on. The WiFi module 890 provides wireless broadband Internet access for the user. Although FIG. 9 shows the WiFi module 890, it may be understood that the WiFi module 890 is not a mandatory part of the mobile phone 800, and can be omitted as required without changing the essence of the present invention.

The processor 830 is a control center of the mobile phone 800, connects all parts of the entire mobile phone by using various interfaces and lines, and performs various functions and data processing of the mobile phone 800 by running or executing the software program and/or the module that are/is stored in the memory 840 and by invoking data stored in the memory 840, to implement a plurality of services that are based on the mobile phone. Optionally, the processor 830 may include one or more processing units. Preferably, an application processor and a modem processor may be integrated into the processor 830. The application processor mainly processes an operating system, a user interface, an application program, and the like. The modem processor mainly processes wireless communication. It may be understood that the foregoing modem processor may not be integrated into the processor 430.

The mobile phone 800 further includes the power supply 820 (such as a battery) that supplies power to the components. Preferably, the power supply may be logically connected to the processor 830 by using a power supply management system, so that functions such as charging, discharging, and power consumption management are implemented by using the power supply management system.

The mobile phone 800 may further include a camera, a Bluetooth module, and the like, which are not shown though.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image obtaining method, wherein the method comprises:
   when a terminal device moves, collecting, by a motion sensor, motion data of the terminal device, and sending the motion data to an optical image stabilization (OIS) controller and an electronic image stabilization (EIS) controller, wherein the terminal device comprises the motion sensor, the OIS controller, the EIS controller, and an image sensor;
   controlling, by the OIS controller, movement of a lens of the terminal device based on the motion data;
   collecting, by the image sensor, an image sequence comprising a plurality of frames;
   obtaining, by the OIS controller, motion data corresponding to each frame from the motion data using a frame synchronization signal that detects a start and end of exposure of each frame and movement information of the lens of corresponding to each frame using the frame synchronization signal that detects the start and end of exposure of each frame; and
   performing, by the EIS controller by using the movement information of the lens corresponding to each frame and the motion data corresponding to each frame, a jitter compensation on the image sequence collected by the image sensor.

2. The method according to claim 1, wherein the terminal device further comprises a Hall effect sensor, and before the performing, the jitter compensation on the image sequence, the method further comprises:
   collecting, by the Hall effect sensor, the movement information of the lens corresponding to each frame; and
   wherein performing the jitter compensation on the image sequence comprises:
   performing, by the EIS controller by using the movement information of the lens corresponding to each frame collected by the Hall effect sensor and the motion data corresponding to each frame, the jitter compensation on the image sequence collected by the image sensor.

3. The method according to claim 2, wherein after collecting, by the Hall effect sensor, the movement information of the lens corresponding to each frame, the method further comprises:

converting, by the OIS controller or the EIS controller, the movement information of the lens corresponding to each frame into a lens movement pixel compensation amount; and
wherein performing the jitter compensation on the image sequence comprises:
performing, by the EIS controller by using the lens movement pixel compensation amount and the motion data corresponding to each frame, the jitter compensation on the image sequence collected by the image sensor.

4. The method according to claim 3, wherein performing the jitter compensation on the image sequence comprises:
   determining, by the EIS controller based on the motion data corresponding to each frame, a motion pixel compensation amount of the image sequence collected by the image sensor;
   subtracting, by the EIS controller, the lens movement pixel compensation amount from the motion pixel compensation amount to obtain an image sequence pixel compensation amount; and
   performing, by the EIS controller by using the image sequence pixel compensation amount, the jitter compensation on the image sequence collected by the image sensor.

5. The method according to claim 1, wherein before the performing, the jitter compensation on the image sequence, the method further comprises:
   sending, by the OIS controller, the motion data corresponding to each frame and the movement information of the lens corresponding to each frame to the EIS controller.

6. The method according to claim 5, wherein the terminal device further comprises an image signal processor (ISP), and the sending, by the OIS controller, the motion data corresponding to each frame and the movement information of the lens corresponding to each frame to the EIS controller comprises:
   sending, by the OIS controller, the motion data corresponding to each frame and the movement information of the lens corresponding to each frame to the EIS by using the ISP; and
   receiving, by the EIS controller by using the ISP, the motion data corresponding to each frame and the movement information of the lens corresponding to each frame that are sent by the OIS controller and obtained using the frame synchronization signal.

7. The method according to claim 6, wherein after collecting the image sequence, the method further comprises:
   sending, by the image sensor, the image sequence to the ISP; and
   receiving, by the ISP, the collected image sequence sent by the image sensor, and sending the image sequence collected by the image sensor to the EIS controller.

8. The method according to claim 1, wherein the motion data comprises:
   rotation data of the terminal device on an X-axis, a Y-axis, and a Z-axis, and/or translation data of the terminal device on the X-axis and the Y-axis.

9. A terminal device comprising:
   a motion sensor, configured to: when the terminal device moves, collect motion data of the terminal device, and send the motion data to an optical image stabilization (OIS) controller and an electronic image stabilization (EIS) controller;

the OIS controller being configured to control movement of a lens of the terminal device based on the motion data;

an image sensor configured to collect an image sequence comprising a plurality of frames;

wherein, before the EIS controller performs a jitter compensation on the image sequence, the OIS controller is configured to obtain motion data corresponding to each frame from the motion data using a frame synchronization signal that detects a start and end of exposure of each frame and to obtain movement information of the lens corresponding to each frame using the frame synchronization signal that detects the start and end of exposure of each frame; and the EIS controller being configured to perform, by using movement information of the lens corresponding to each frame and the motion data corresponding to each frame, the jitter compensation on the image sequence collected by the image sensor.

10. The terminal device according to claim 9, wherein the terminal device further comprises:

a Hall effect sensor configured to collect the movement information of the lens corresponding to each frame before the EIS controller performs the jitter compensation on the image sequence, wherein the EIS controller is configured to perform, by using the movement information of the lens corresponding to each frame collected by the Hall effect sensor and the motion data, the jitter compensation on the image sequence collected by the image sensor.

11. The terminal device according to claim 10, wherein the OIS controller or the EIS controller is further configured to:

after the Hall effect sensor collects the movement information of the lens corresponding to each frame, convert the movement information of the lens corresponding to each frame into a lens movement pixel compensation amount; and the EIS controller is further configured to perform, by using the lens movement pixel compensation amount and the motion data, the jitter compensation on the image sequence collected by the image sensor.

12. The terminal device according to claim 11, wherein the EIS controller is further configured to:

determine, based on the motion data corresponding to each frame, a motion pixel compensation amount of the image sequence collected by the image sensor;

subtract the lens movement pixel compensation amount from the motion pixel compensation amount to obtain an image sequence pixel compensation amount; and perform, by using the image sequence pixel compensation amount, the jitter compensation on the image sequence collected by the image sensor.

13. The terminal device according to claim 9, wherein the OIS controller is further configured to:

send the motion data corresponding to each frame and the movement information of the lens corresponding to each frame to the EIS controller.

14. The terminal device according to claim 13, wherein the terminal device further comprises an image signal processor (ISP), and the OIS controller is further configured to send the motion data corresponding to each frame and the movement information of the lens corresponding to each frame to the EIS controller by using the ISP; and the EIS controller is configured to receive, by using the ISP, the motion data corresponding to each frame and the movement information of the lens corresponding to each frame that are sent by the OIS controller and obtained using the frame synchronization signal.

15. The terminal device according to claim 14, wherein the image sensor is further configured to:

after collecting the image sequence, send the collected image sequence to the ISP; and wherein the ISP is configured to: receive the collected image sequence sent by the image sensor, and send the image sequence collected by the image sensor to the EIS controller.

16. The terminal device according to claim 9, wherein the motion data comprises:

rotation data of the terminal device on an X-axis, a Y-axis, and a Z-axis, and/or translation data of the terminal device on the X-axis and the Y-axis.

17. A device comprising:

a lens;

a motion sensor configured to collect motion data of the device when the device makes a movement;

an optical image stabilization (OIS) controller configured to control movement of the lens based on the motion data;

an image sensor configured to collect an image sequence comprising a plurality of frames;

a Hall effect sensor configured to collect movement information of the lens corresponding to each frame;

wherein the OIS controller is configured to obtain motion data corresponding to each frame from the motion data using a frame synchronization signal that detects a start and end of exposure of each frame and to obtain movement information of the lens corresponding to each frame using the frame synchronization signal that detects the start and end of exposure of each frame; and an electronic image stabilization (EIS) controller configured to perform, by using the movement information of the lens and the motion data corresponding to, a jitter compensation on the image sequence.

18. The device according to claim 17, wherein the EIS controller is further configured to:

obtain a lens movement pixel compensation amount based on the movement information of the lens corresponding to each frame;

determine, based on the motion data corresponding to, a motion pixel compensation amount of the image sequence; and subtract the lens movement pixel compensation amount from the motion pixel compensation amount to obtain an image sequence pixel compensation amount, wherein the jitter compensation is performed using the image sequence pixel compensation amount.

19. The device according to claim 17, further comprising:

an image signal processor (ISP), wherein the OIS controller is further configured to send the motion data and the movement information of the lens to the EIS controller by using the ISP, and wherein the EIS controller is configured to receive, by using the ISP, the motion data and the movement information of the lens that are sent by the OIS controller and obtained based on the frame synchronization signal.

20. The device according to claim 17, wherein the motion data comprises:

rotation data of the device on an X-axis, a Y-axis, and a Z-axis, and/or translation data of the device on the X-axis and the Y-axis.

* * * * *

UNITED STATES PATENT AND TRADEMARK OFFICE
CERTIFICATE OF CORRECTION

| | |
|---|---|
| PATENT NO. | : 11,057,565 B2 |
| APPLICATION NO. | : 16/342498 |
| DATED | : July 6, 2021 |
| INVENTOR(S) | : Yuanyou Li |

It is certified that error appears in the above-identified patent and that said Letters Patent is hereby corrected as shown below:

In the Claims

In Claim 1, Column 17; Line 43 delete "the lens of corresponding" insert --the lens corresponding--

Signed and Sealed this
Seventh Day of September, 2021

Drew Hirshfeld
*Performing the Functions and Duties of the
Under Secretary of Commerce for Intellectual Property and
Director of the United States Patent and Trademark Office*